UNITED STATES PATENT OFFICE.

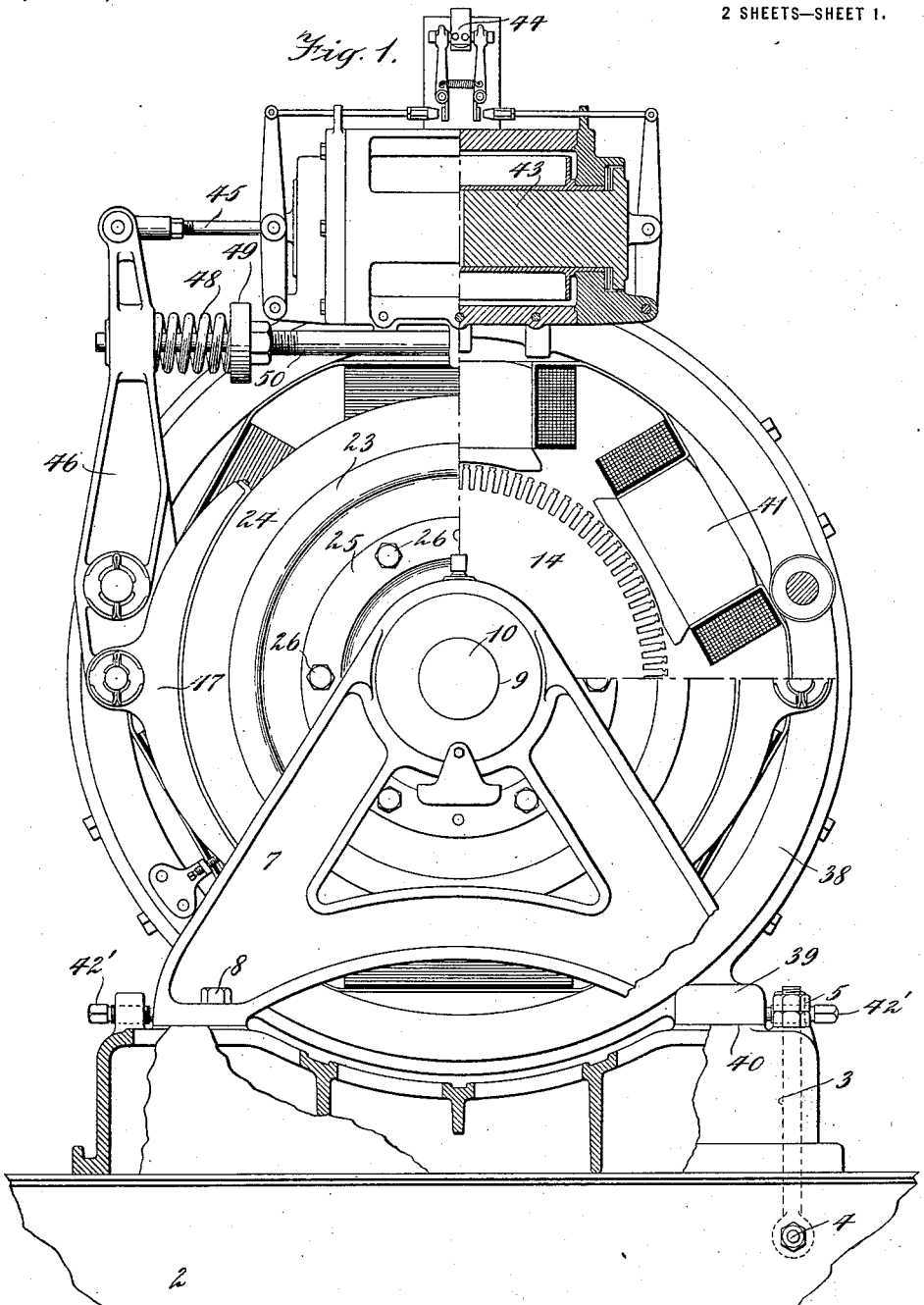

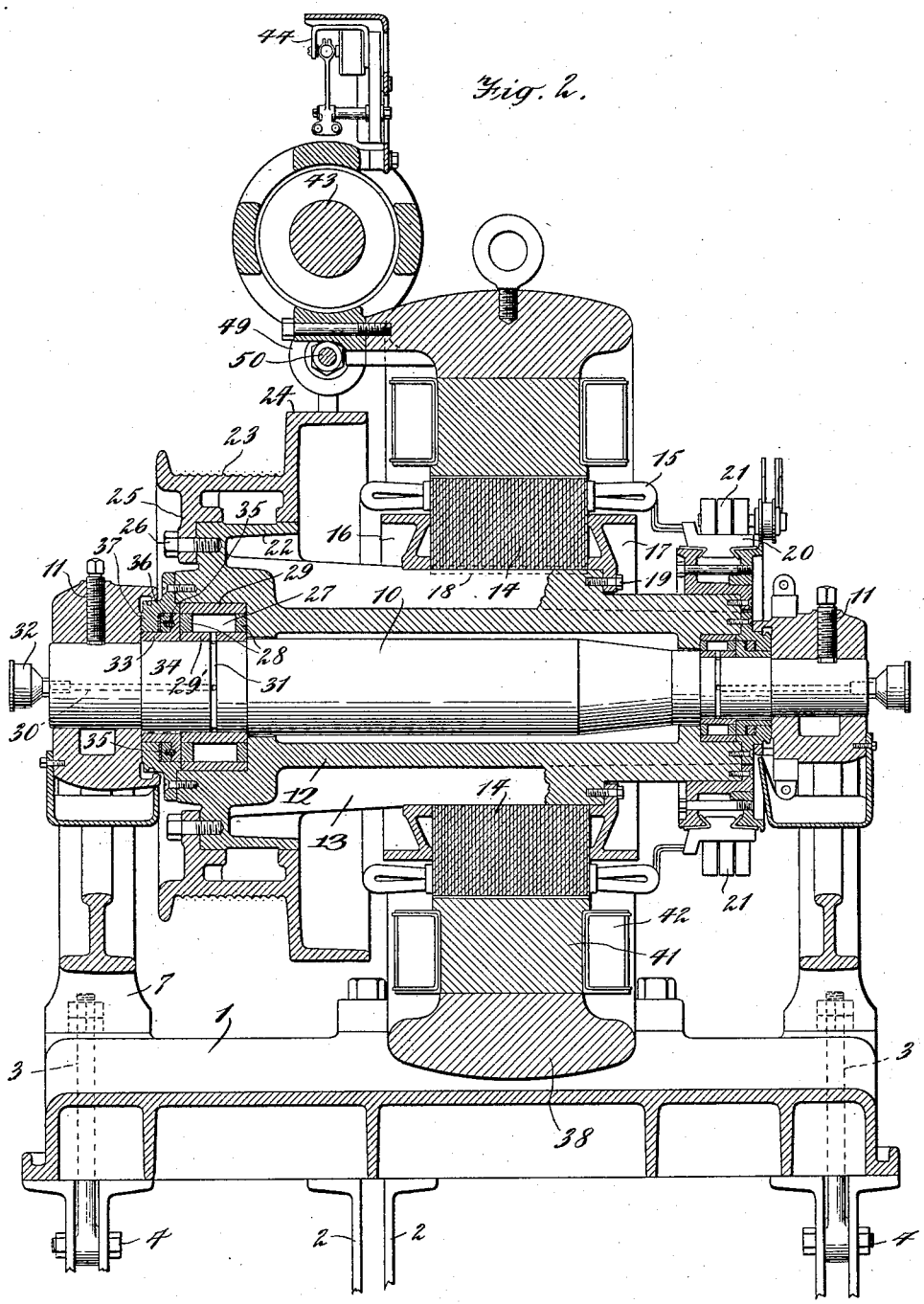

NILS O. LINDSTROM, OF NUTLEY, NEW JERSEY, ASSIGNOR TO ALONSO B. LEE, OF BROOKLYN, NEW YORK.

ELECTRIC MOTOR.

1,171,964.      Specification of Letters Patent.      Patented Feb. 15, 1916.

Application filed August 1, 1914. Serial No. 854,460.

*To all whom it may concern:*

Be it known that I, NILS O. LINDSTROM, a citizen of the United States, residing at Nutley, in the county of Essex and State of New Jersey, have invented certain new and useful Improvements in Electric Motors, of which the following is a full, clear, and exact description.

This invention relates to electric motors and more particularly to motors adapted for use with elevators and various forms of apparatus requiring a hoisting motor.

In the present construction of hoisting motors, the common practice is to rigidly mount the rotor and hoisting drum on a rotating shaft which is suitably supported at its ends in bearings carried by a supporting frame. Since the hoisting drum is necessarily mounted adjacent one end of the shaft, the lateral pull resulting from the tension on the hoisting cable soon causes the shaft to work loose in its bearings, resulting in a vibration of the parts which is highly objectionable. Moreover, if the bearings are not replaced in a comparatively short time, the rotating shaft may crystallize or the rotor thrown sufficiently out of alinement to strike the pole pieces or other stationary parts of the machine. These and other objections make the present supporting structure for the rotating parts inadequate to sustain the stresses incident to the load to which the motor is subjected and the aim of this invention is to provide a mounting which will overcome these objections and which is of a simple, compact and practical construction.

With these objects in view, the invention consists of a stationary shaft which is rigidly supported on standards or pedestals bolted to a bed-plate. Mounted for rotation on the stationary shaft is a sleeve which is properly supported by suitable anti-friction devices. This sleeve carries the rotor, the hoisting drum and other rotating parts so that the lateral pull on the shaft resulting from the load on the hoisting drum instead of being transmitted to a rotating part as in the present construction, is carried by the stationary rectangular frame which may readily be made sufficiently rigid to sustain the same and as the shaft does not rotate, any danger of it working loose in its bearings is eliminated.

The invention also consists of the combinations and constructions which will be hereinafter described and particularly pointed out in the appended claims.

In the accompanying drawings: Figure 1 is a side elevation partly in section of an electric motor embodying the features of my invention; and Fig. 2 is a central vertical longitudinal section of Fig. 1.

A hollow cast iron bed-plate 1, which is of the usual construction, is suitably supported on channel irons 2 to which it is secured by the I-bolts 3, the lower ends of which are provided with eyes into which transverse bolts 4 passing through the channel irons fit, while the upper ends are suitably threaded to receive nuts 5. Up-right standards or pedestals 7, are rigidly secured to the bed-plates by the bolts 8, the abutting surfaces of the standards and bed being finished to provide smooth flat surfaces so that the standards will be immovably maintained in position. These standards, as shown, are substantially tri-angular in shape and at their upper ends are provided with hubs having circular apertures 9 of a size to receive the ends of a stationary shaft 10, which snugly fits into the same and is rigidly held in place by set screws 11. The stationary shaft is of relatively large diameter and together with the up-right standards and bed-plate, form a rigid rectangular frame, which will sustain without any relative movement the component parts, the stresses and strains to which it is subjected by the load carried by the revoluble members of the motor, as will be hereinafter referred to.

Loosely surrounding the shaft 10 is a sleeve 12, which extends substantially the entire length between the standards 7 and is provided with a plurality of ribs 13, two of which are shown in Fig. 2 of the drawing. The rotor, which in the direct current machine shown, constitutes the armature, comprises a laminated core 14 of the usual construction, having the armature coils 15 suitably secured in peripheral slots therein. The laminations are securely fastened between clamping end rings or plates 16 and 17, and are made fast to the sleeve 12, by means of keys 18, fitting in suitable keyways cut in the core and in a plurality of the ribs, only one of such keys, however, being shown, the plate 16 resting against a shoulder formed upon the ribs 13, while the end plate 17 is secured to the end surfaces of these ribs by means of bolts 19. Suitably supported upon the right-hand end of the sleeve 12 is the usual form of commutator comprising segments 20 which are connected to the coils of the armature and which are in electrical contact with brushes 21 in the usual manner. The left-hand end of the sleeve 12 is of increased thickness and has projecting therefrom a laterally extending flange 22. A hoisting drum 23 and brake drum 24, which are preferably made integral, fit over the flange 22 and are secured in place by means of the annular flange 25, projecting inwardly from the drum which abuts against the end surface of the sleeve and to which it is secured by means of the bolts 26. The inner surfaces of the ends of the sleeves are recessed to form annular recesses into which roller bearings of the usual construction are fitted, the bearings comprising rolls 27 which are held suitably spaced apart by the rings 28 and are adapted to ride upon the race-ways 29 and 29'. To lubricate the rolls centrally disposed conduits 30 extend inwardly from the ends of the shaft and are connected with transverse conduits 31 which lead to the rollers, while threaded in the ends of the conduits are oil cups 32. Collars 33 provided with upstanding flanges 34 abut the outer ends of the roller bearings against which they are maintained by springs 35 interposed between the collars and annular rings 36, which are held in place by caps 37 carried by the ends of the sleeves. A washer of fiber or like material is preferably interposed between the cap and the ring to prevent the leakage of oil.

The construction described constitutes the important features of my invention, for by providing a loose sleeve surrounding a stationary shaft which is rigidly supported by a suitable frame and mounting the rotor and the hoisting drum, as well as the brake band upon this sleeve, while interposing between the ends of the sleeve and the stationary shaft, suitable anti-friction devices, a construction is obtained which will readily sustain the armature and other revoluble members of the combination against any angular thrust or movement and the gyrations of the shaft which have heretofore occurred, due to the ends of the shaft working loose in their bearings, is entirely eliminated. It may be here noted that the roller bearings directly beneath the hoisting drum are of much greater size than the roller bearings beneath the commutator, as it is apparent that practically the entire load to which the parts are subjected is transmitted to the shaft at this point.

The standards or pedestals 7 to which are rigidly secured the stationary shaft and bed-plate, form a rigid rectangular frame which is sufficiently strong to sustain the angular thrusts or movements to which the same are subjected through the sleeve, but even should the angular thrust be sufficient to draw the standards 7 somewhat out of their perpendicular position, the same would not be as objectionable as if a rotating shaft works loose in its bearings, since the shaft is stationary and there will be no vibration, due to gyratory movement of the revoluble parts.

The stationary field of the motor is of a usual construction and consists of an annular frame or yoke 38 which is provided with feet 39 by which the frame is rigidly mounted upon the bed-plate, the bed-plate being suitably finished as at 40 in order to form a solid bearing for the frame. Bolted to the annular frame are the pole-pieces 41 which carry the usual field coils 42, the annular frame being adjustable with respect to the armature by means of the adjusting bolts or screws 42' which are commonly utilized to correctly position the faces of the pole-pieces concentric to the axis of rotation of the armature. Suitably secured to the upper end of the field frame, is the brake coil 43 which carries the usual form of circuit breaker 44, the brake coil being adapted through its cores and links 45 and 46 to release the brake shoes 47, only one of which is shown, which shoes are normally spring-pressed against the brake band by means of the compression springs 48, one end of which bears against the link 46 while the other end rests against a washer 49, carried by a stationary rod 50 secured to the annular frame 38.

Having described my invention, I claim:—

1. In an electric hoisting motor, a stationary shaft, a supporting structure therefor, comprising a base and two standards into which the ends of the shaft fit, means for securing the ends of the shaft in said standards, a sleeve revolubly mounted on said shaft, and a rotor and hoisting drum rigidly mounted on said sleeve.

2. In an electric hoisting motor, a stationary shaft, a supporting structure therefor, said shaft being of reduced diameter adjacent one end thereof, a sleeve loosely surrounding said shaft and roller bearing interposed between said shaft and sleeve, said roller bearing at the large end of the shaft being of greater size, and a rotor and hoisting drum rigidly mounted on said sleeve, said drum being in alinement with the larger set of roller bearings.

3. In an electric hoisting motor, a stationary shaft, a supporting structure therefor comprising a base and two standards into which the ends of the shaft fit, means for securing the ends of the shaft in said standards, a sleeve revolubly mounted on said shaft, and a rotor, hoisting drum, and brake drum rigidly mounted on said sleeve.

4. In an electric hoisting motor, a stationary shaft, a supporting structure therefor comprising a base and two standards into which the ends of the shaft fit, means for securing the ends of the shaft in said standards, a sleeve revolubly mounted on said shaft, and a rotor, hoisting drum, brake drum, and a commutator rigidly mounted on said sleeve.

5. In an electric hoisting motor, a stationary shaft, a supporting structure therefor, said shaft being of reduced diameter at one end, a sleeve rotatably mounted on said shaft, a rotor, hoisting drum and commutator carried by said sleeve, said commutator being disposed over the reduced end of the shaft and said drum over the other larger end thereof.

6. In an electric hoisting motor, a base, an annular field yoke supported above said base, a stationary shaft, uprights mounted on said base and rigidly supporting said stationary shaft, a sleeve rotatably supported on said shaft, and a rotor and hoisting drum mounted on said sleeve.

7. In an electric hoisting motor, a base, an annular field yoke supported above said base, a stationary shaft, uprights mounted on said base rigidly supporting said shaft, a rotor, hoisting drum and brake drum mounted on said sleeve, said brake and hoisting drums being disposed to one side of said annular yoke, and brake shoes carried by said annular yoke adapted to engage said brake drum.

In witness whereof, I subscribe my signature, in the presence of two witnesses.

NILS O. LINDSTROM.

Witnesses:
 WALDO M. CHAPIN,
 JULE ZELENKO.

Copies of this patent may be obtained for five cents each, by addressing the "Commissioner of Patents, Washington, D. C."

It is hereby certified that the name of the assignee in Letters Patent No. 1,171,964, granted February 15, 1916, upon the application of Nils O. Lindstrom, of Nutley, New Jersey, for an improvement in "Electric Motors," was erroneously written and printed as "Alonso B. Lee," whereas said name should have been written and printed as *Alonso B. See*, as shown by the records of assignments in this office; and that the said Letters Patent should be read with this correction therein that the same may conform to the record of the case in the Patent Office.

Signed and sealed this 29th day of February, A. D., 1916.

[SEAL.]

R. F. WHITEHEAD,

*Acting Commissioner of Patents.*

Cl. 172—152.